United States Patent
Reed et al.

(10) Patent No.: US 9,262,233 B1
(45) Date of Patent: Feb. 16, 2016

(54) SECOND-ORDER TUNING OF SPIN LOOPS

(71) Applicant: Software AG, Darmstadt (DE)

(72) Inventors: Christopher Reed, Newmarket (GB); Mark Horsburgh, Cambridge (GB); Matthew Johnson, Cambridge (GB)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/503,754

(22) Filed: Oct. 1, 2014

(51) Int. Cl.
*G06F 9/46* (2006.01)
*G06F 9/52* (2006.01)

(52) U.S. Cl.
CPC ........................................ *G06F 9/52* (2013.01)

(58) Field of Classification Search
CPC ...................................... G06F 9/52; G06F 9/46
USPC ............................................................. 718/102
See application file for complete search history.

(56) References Cited

U.S. PATENT DOCUMENTS

| 5,444,420 A * | 8/1995 | Wernlund | H03L 7/081 327/107 |
| 2008/0172670 A1 * | 7/2008 | Corrigan | G06F 9/526 718/104 |
| 2009/0116603 A1 * | 5/2009 | Wang | H03L 7/00 375/376 |

OTHER PUBLICATIONS

Torvald Riegel, "[RFC] improving spinning in adaptive mutexes", GNU C Library (glibc) project, Feb. 28, 2013. (Discussed on pp. 7-8 of the specification).

Henry Ou, "Long Duration Spin-wait Loops on Hyper-Threading Technology Enabled Intel Processors", May 3, 2010, <https://software.intel.com/en-us/articles/long-duration-spin-wait-loops-on-hyper-threading-technology-enabled-intel-processors>.
Phuong Hoai Ha et al., "Efficient self-tuning spin-locks using competitive analysis", The Journal of Systems and Software 80, pp. 1077-1090, 2007.
"Using Spin-Loops on Intel Pentium 4 Processor and Intel Xeon Processor" Intel Corporation, May 24, 2001. <https://software.intel.com/sites/default/files/m/d/4/1/d/8/17689_w_spinlock.pdf>.
Philip Levis et al., "TinyOS Programming", Jul. 16, 2009. <http://csl.stanford.edu/~pal/pubs/tos-programming-web.pdf>.
"Managing Lock Contention: Large and Small Critical Sections", Intel Corporation, Nov. 4, 2011. <https://software.intel.com/en-us/articles/managing-lock-contention-large-and-small-critical-sections>.
"InitializeCriticalSectionAndSpinCount() spin counts", May 16, 2009. <http://codeverge.com/embarcadero.cppbuilder.native/initializecriticalsectionandspi/1076899>.
Beng-Hong Lim et al., "Reactive Synchronization Algorithms for Multiprocessors", Massachusetts Institute of Technology, Feb. 1995.

* cited by examiner

*Primary Examiner* — Anna Deng
(74) *Attorney, Agent, or Firm* — Posz Law Group, PLC

(57) ABSTRACT

A method and/or computer for a tuned spin count in a multi-threaded system determines a re-calculation time interval at which to re-calculate a current spin lock value. Then, a spin-lock-re-calculation is repeatedly executed at the re-calculation time interval to perform:
observing a current environment of the multithreaded system, determining, using a second-order tuning and values of the current environment, a dynamically calculated heuristic to provide the newly-recalculated spin lock value, and memorizing the newly re-calculated spin lock value, in a memory, as the current spin lock value. Meanwhile, thread(s) in the multithreaded system which want to execute a spinlock will obtain the current spin lock value which is memorized in the memory, and execute the spin lock using the current spin lock value to set a length of the spin lock.

18 Claims, 12 Drawing Sheets

SECOND ORDER TUNING – HIGH THROUGHPUT, HIGH LATENCY CASE

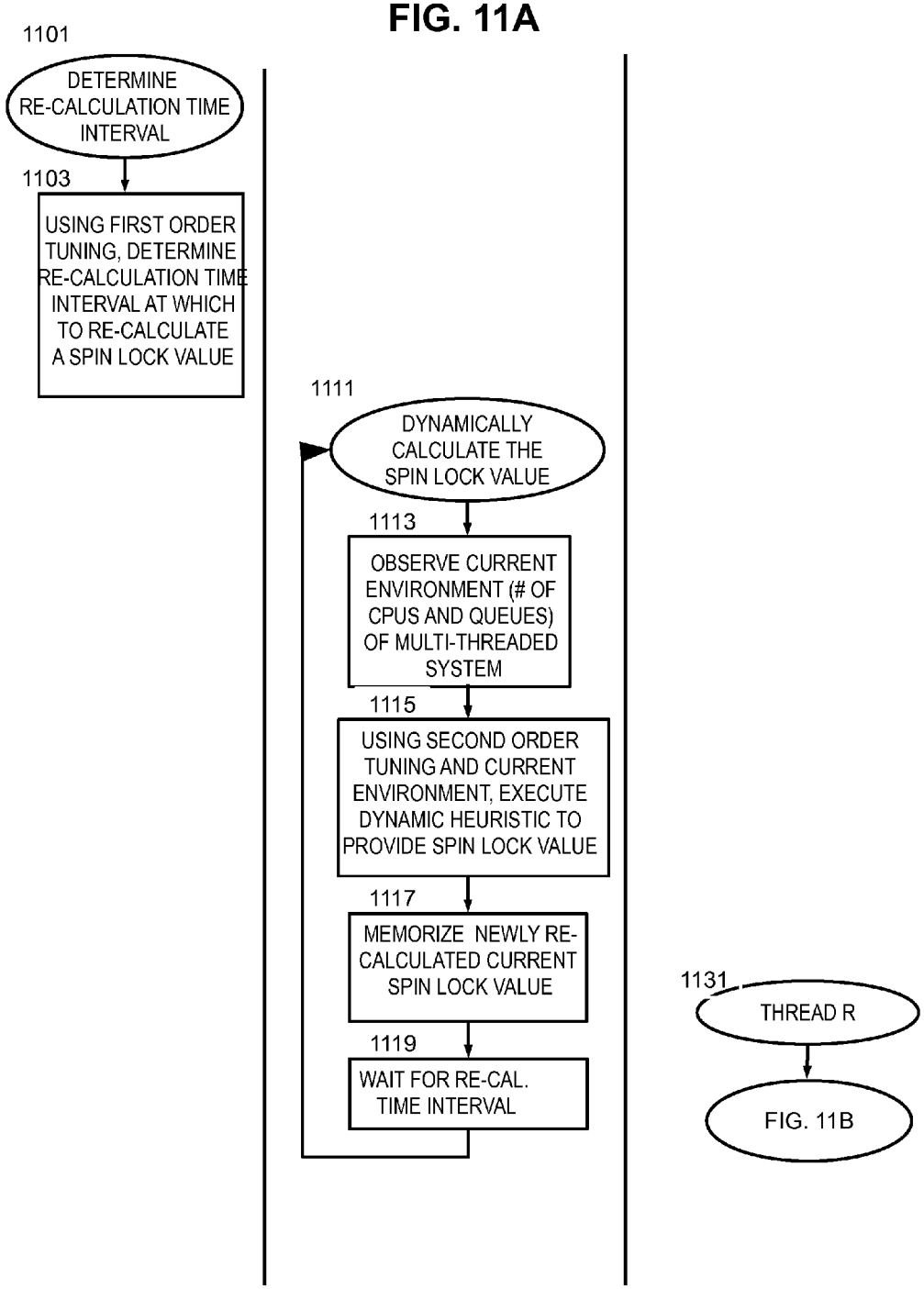

SECOND-ORDER TUNING OF SPIN LOOPS

TECHNICAL FIELD

The technical field relates in general to the field of operating systems, and more particularly to thread management.

BACKGROUND

There may be many cases where one thread in an application has to wait for another thread to reach a certain point before the thread can make further progress. This may be a thread which is, for example, waiting on a mutual exclusion lock (mutex), or which is consuming events from a queue, and needs work to be placed on the queue before progress can be made. A typical simplistic approach to the need to wait for another thread is to make use of operating system primitives, exposed through interfaces such as pthread's condition variables, to allow a thread to wait (using a wait call) until another thread has signaled it to wake up (using a signal call). This is perfectly reasonable in cases with low performance requirements. Nevertheless, at higher throughputs, the following problems are exhibited:

Both wait and signal require invocations into the operating system (OS) scheduler, paying the cost of a system call, the cost of any scheduler operations, and because the OS scheduler is typically a single entity in a system, scalability problems as many threads calling into the scheduler will be serialized.

When one thread signals another thread, both threads will typically contend on mutexes or atomic compare and swap operations, leading to cache misses and CPU stalls.

Much higher throughput can be achieved if, instead of immediately executing the wait/signal synchronization primitives, threads which need to wait for a resource simply put off checking the resource that they are waiting on, so as to examine the resource after a short delay. If a thread is not blocked on a wait, then the thread making the resource available does not have to signal the consuming thread, provided that it is known that the thread waiting on the resource will examine the resource in a short time. Again, the simplistic approach is to use operating system primitives such as a sleep call, but these suffer from the same scheduler interaction problems as wait does, namely, there is a relatively large cost in interacting with the OS scheduler. Furthermore, sleeps are typically of a much coarser resolution than is desired (on the order of milliseconds to tens or hundreds of milliseconds), which causes very large latencies and much larger than desired batches (which further can cause cache misses or even can cause a process to swap out to disk, adversely affecting performance).

Instead of using a "wait" call or a "sleep" call to the OS scheduler, a common technique is for a thread to execute a loop a certain number of times, for the purpose of delaying further useful execution of the thread before examining the resource. This is referred to as a "spin loop." The spin loop takes a number of CPU clock cycles to complete but does not otherwise do anything useful. By delaying to examine the resource under contention, contention is reduced. Furthermore, by not calling the OS scheduler, the disadvantages of interacting with the scheduler are avoided.

The optimal spin time for a spin loop is such that it is short enough to be comparable to the time it would have taken to use wait and signal (taking into account the cost of both the overhead of the wait and the signal), but large enough to reduce contention on the resource being waited on. Otherwise, CPU cache misses are provoked on both the consumer thread and, more critically, the producing thread. After a spin loop has completed, if there is still no way for that thread to make progress (for example, the mutex it is waiting to lock is still held, or no work has been added to a queue), then it may be desirable to fall back to the OS scheduler-driven wait and signal technique. Although the overhead using the OS scheduler is greater than the spin loop, it is undesirable to have threads simply spinning in spin loops for long durations which do not achieve useful work, because this can prevent other threads from getting useful work done, and it wastes energy, thereby increasing running costs. Thus, a spin loop which is too short can degrade to the simplistic wait and signal approach, with the attendant performance problems.

These and other known solutions are examples of standard techniques for mutually coordinating between threads which can be synchronized with each other and/or can share resources, for example.

Nevertheless, the conventional spin loop technique, and the wait/signal operations, do not overcome drawbacks and can exhibit problems in operation in real world scenarios.

SUMMARY

Accordingly, one or more embodiments provide a method, computer device and/or non-transitory computer readable medium that provides a tuned spin count in a multithreaded system. There is provided a memory, which is configured to store a current spin lock value; and a processor cooperatively operable with the memory. The processor is configured to determine a re-calculation time interval at which to re-calculate a current spin lock value; repeatedly execute, at the re-calculation time interval, a spin-lock-re-calculation; and to obtain in at least one thread, the current spin lock value which is in the memory, and executing a spin lock in at least one thread using the current spin lock value to set a length of the spin lock. The spin-lock-re-calculation: observes a current environment of the multithreaded system; determines, using a second-order tuning and values of the current environment, a dynamically calculated heuristic to provide the newly-recalculated spin lock value; memorizes the newly re-calculated spin lock value in the memory as the current spin lock value. Consequently, thread(s) in the multithreaded system which want to execute a spinlock will obtain the current spin lock value which is memorized in the memory at the time that thread is executed and which reflects the current state (for example, throughput capacity/latency) of the multithreaded system, and executes the spin lock using the current spin lock value to set a length of the spin lock.

In another embodiment, the re-calculation time interval at which the spin-lock-re-calculation is executed to observe the current environment is calculated as a constant ratio of a signal call time.

In yet another embodiment, the re-calculation time interval is determined using a first-order tuning which uses an exponentially weighted moving average (EWMA) of time taken to signal another thread.

In still another embodiment, the current environment which is observed by the spin-lock-re-calculation and used to determine the newly-recalculated spin lock value is: contention on a run queue of a scheduler of the multithreaded system.

In a further embodiment the current environment which is observed by the spin-lock-re-calculation and used to determine the newly-recalculated spin lock value is: load on the multithreaded system as measured by actual number of events currently on all event queues internal to all threads currently in the multithreaded system; actual number of currently runnable threads in the multithreaded system; and moving average of time taken to signal another thread.

In yet a further embodiment, the spin-lock-re-calculation that is executed to provide the current spin lock value is a dedicated thread.

According to another embodiment, there are provided methods according to the above. In a further embodiment, the processor is further configured to perform according to the above methods. Yet another embodiment provides a non-transitory computer readable medium, which can perform a method according to one or more of these embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 11A to FIG. 11B collectively are a flow chart illustrating a procedure for second-order tuning of spin loops.

DETAILED DESCRIPTION

I. Introduction

Figure 1:
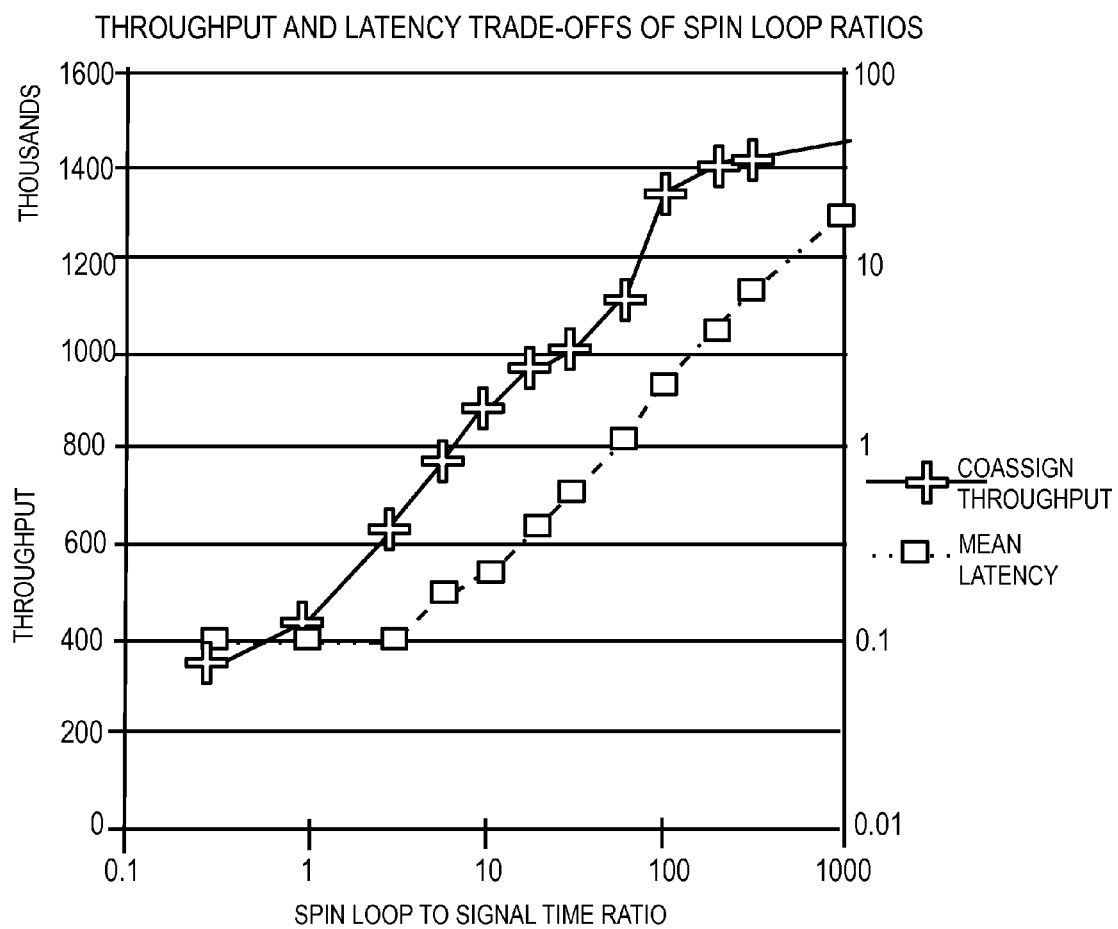
FIG. 1 is chart illustrating throughput and latency trade-offs of spin loop ratios.

In overview, the present disclosure concerns tuning of spin loops that can be used in a situation in which threads running under a scheduler in an operating system (OS) need to synchronize, while preferring to avoid low-level synchronization primitives of the OS scheduler such as wait, sleep, signal, and the like. More particularly, various inventive concepts and principles are embodied in systems, devices, and methods therein for achieving desirable trade-offs in tuning spin loops, so that the spin loop is correctly sized as situations change so as to avoid contention on shared resources such as the scheduler or queues of messages and so as to give better performance characteristics for consumers and producers, in which the size of the length of the spin loop is dynamically determined to take into account continual observations of the immediate environment as it actually is. At certain intervals (the intervals themselves being determined according to the environment) an up-to-date calculation (for example, an EWMA) determines the current adjusted spin counts, using a novel concept referred to as second-order tuning. A specific enhancement of using spin locks executed to the dynamically determined length (first spinning in user space before waiting for a mutex, sometimes referred to as a futex) is discussed.

As further discussed herein below, various inventive principles and combinations thereof are advantageously employed to dynamically tune the spin ratio to have good latency/throughput tradeoffs considering load scenarios as they vary from time-to-time. This can avoid the problems that, when a spin loop is too short, throughput is reduced as contention on a queue is increased, or more scheduler interactions are required; whereas, when a spin loop is too long, then extra latency is added unnecessarily as the thread spends more time spinning than is needed. The ability to dynamically tune the spin ratio as discussed herein recognizes that the same application in different load scenarios may be better off trading throughput for latency or vice versa; and that excess spinning is also costly due to extra power consumption; if a very long pause occurs before work is able to continue, then the application is better off arranging for the operating system scheduler to wake it up, despite the overhead in doing so.

Further in accordance with exemplary embodiments, methods, systems, and devices are provided in which a set of dynamically calculated heuristics are used to determine a dynamically changing spin count, which is to be used by spin lock in threads, given the current state of the system (for example, threads, internal queues, activity). Determining the spin count can itself be costly and may adversely affect throughput and latency, and thus the determination of the spin count can be performed periodically, and the frequency with which the spin count is determined can itself be tuned.

II. Context

State-of-the-art technology provides several approaches to the spin loop problem. The conventional approaches, which the inventors categorize as "zero-order tuning" and "first-order tuning," are summarized in this section, along with the inventors' observations.

A. Zero-Order Tuning

Simplistic approaches use constant values for the size of the spin loop, either as a number of loop iterations, or a constant pre-determined time or other measure. This may be picked by the application developer to be an optimal loop duration, such as for the use case that they tested with on the platform they tested on, or for some anticipated situation, but is unlikely to translate well to other platforms or use cases. This is referred to as "zero-order tuning of spin loops"—no tuning is performed after the loop duration has been pre-determined by the developer, and tuning is certainly not performed while the threads are running. The disadvantages of zero-order tuning are apparent.

B. First-Order Tuning

The Linux kernel provides a mutex implementation called futex ("fast mutex"). These use spin-loops and some research has gone into making them tuned according to how long other operations take, for example, discussed in T. Riegel, "[RFC] improving spinning in adaptive mutexes" (28 Feb. 2013) for the GNU C Library (glibc) project. Nevertheless, only problems have been identified, as in the excerpted commentary quoted below.

Improve adaptation of max spinning. Change max spinning count? In contrast to 2A, it would be good if we can adapt automatically. We probably could hide a lot of the overhead of this in the slow path that spinning (or back-off) are in any case (ie, when we can't acquire the lock we wanted to acquire).

However, it seems to be hard to find a scheme that doesn't rely on many rules of thumb. We'd need the CS duration distribution (plus #threads, so perhaps the lock acquisition latency distribution would be better), not just an average, and we need to have a good understanding of the cache miss costs (which vary) and the futex wake-up latency (including all other costs that are caused by actually blocking (and thus perhaps switching contexts)). We currently don't have the data to drive this in a computational science kind of way (see below).

While the Riegel article may be adaptive, it is first-order tuning: it is taking into account the historical time it has taken to acquire the lock. Nevertheless, in comparison to the second-order tuning discussed below, a device according to the Riegel article does not adjust the ratio of that time to the time spent spinning depending on the load on the system.

Herein, we refer to this conventional idea of scaling the spin loop to the cost of operations that are hoped to be avoided (cache misses, lock acquisition latency, and the like), with the spin loop adjusted to be some fixed ratio of some measurement, as "first-order tuning of spin-loops." This represents a fixed trade-off between throughput and latency. First-order tuning of spin-loops can be measured by modifying the spin-loop ratio and measuring the latency (in terms of spin loop to signal time ratio) verses throughput (in terms of thousands of events) of an event processing system, as illustrated in FIG. 1.

Figure 2:
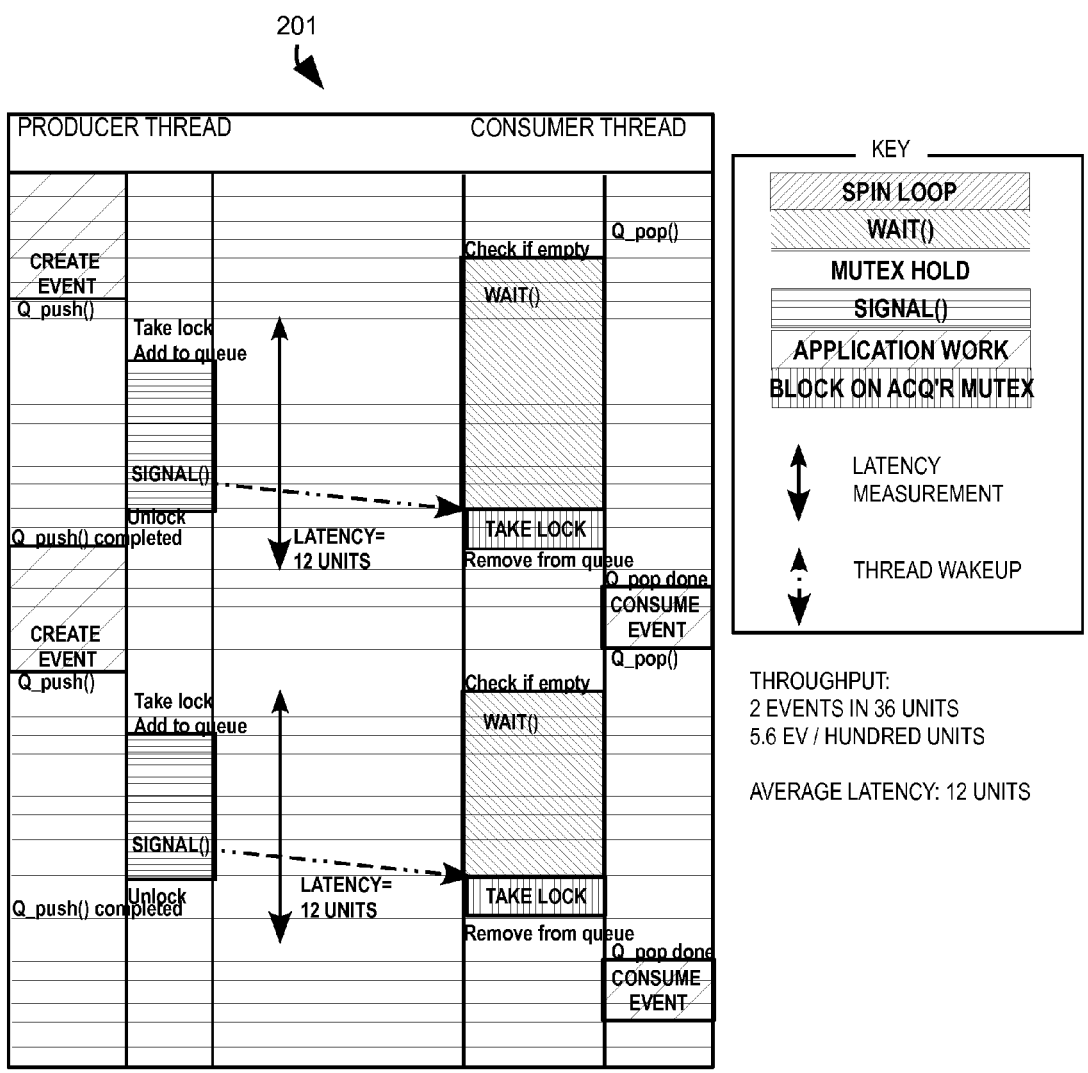
FIG. 2 is a chart representing an event processing system, which uses only wait and signal with no spin loops and in which the rate of event production being similar to the rate of consumption.
Figure 3:
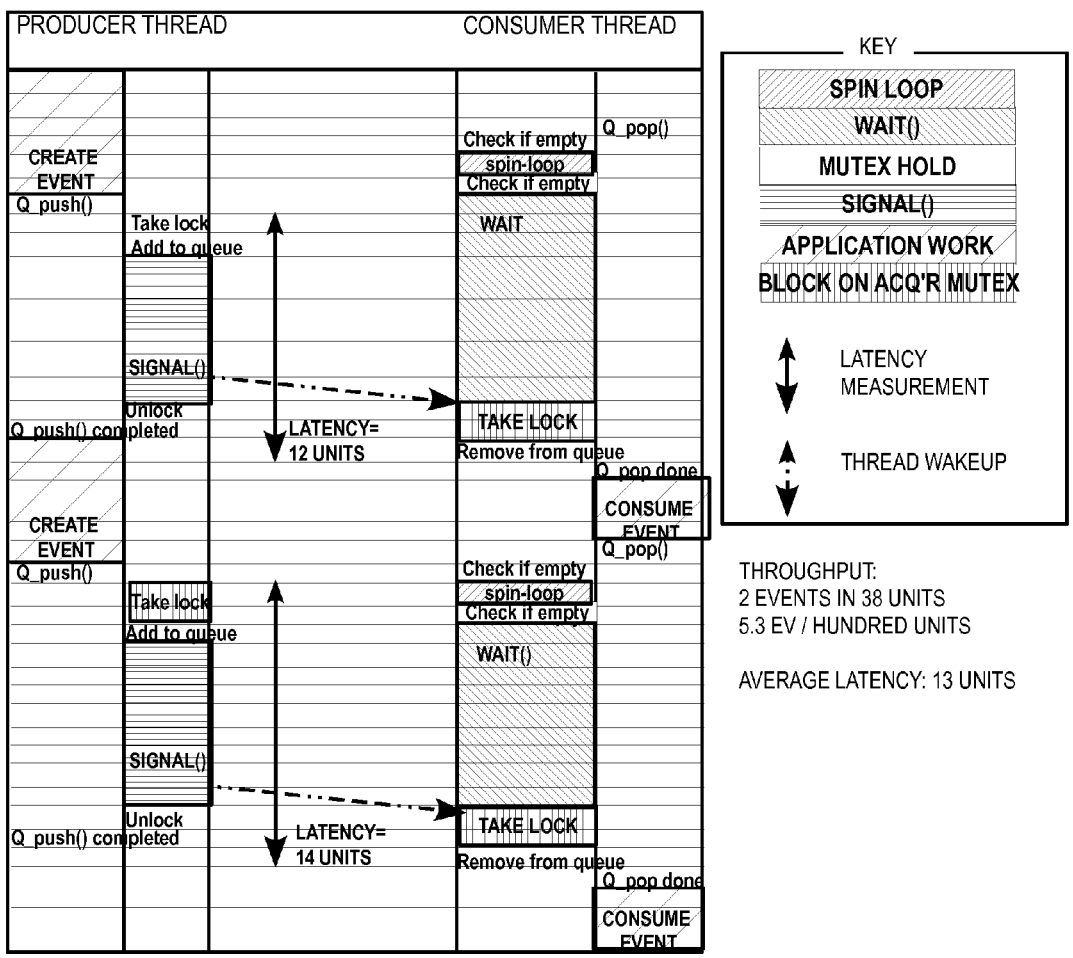
FIG. 3 is another chart representing an event processing system, in which spin-loops are short and the fallback to signaling occurs nearly all of the time.
Figure 4:
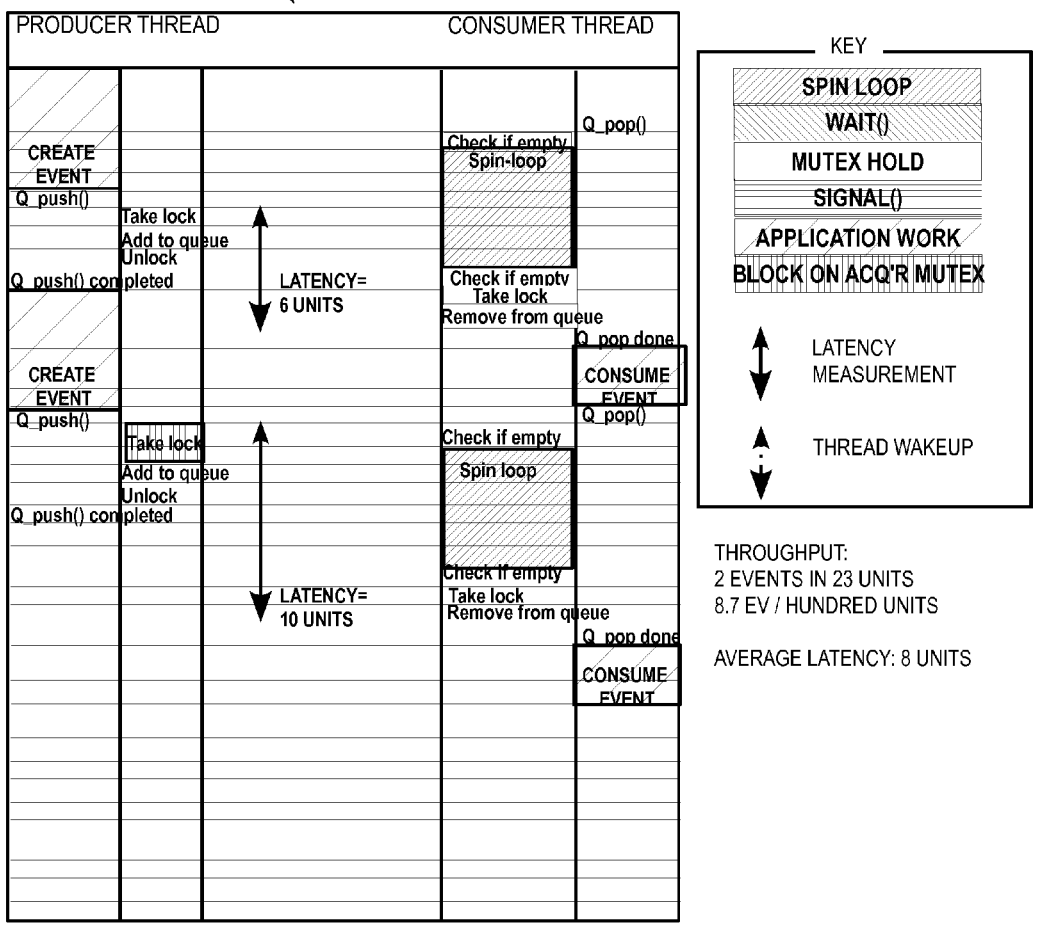
FIG. 4 is another chart representing an event processing system, in which the spin loop is well sized and the signal( ) call can be avoided.
Figure 5:
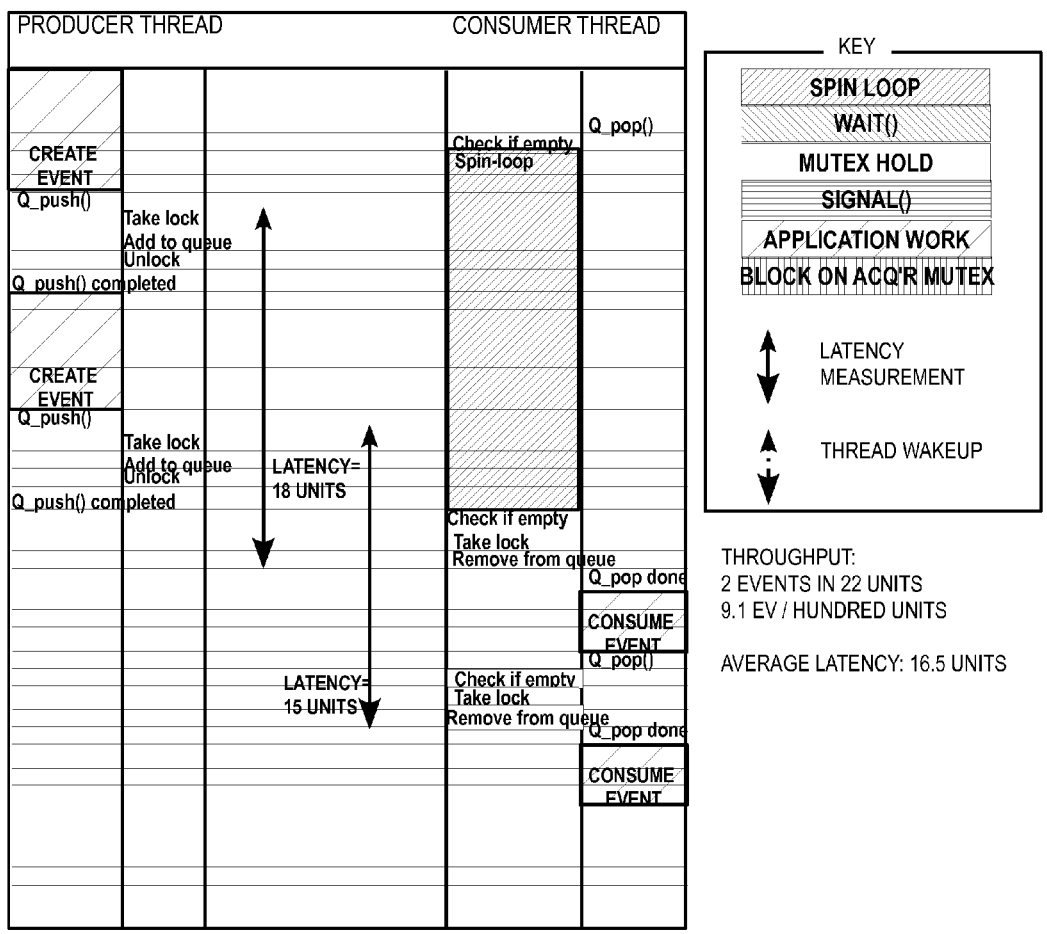
FIG. 5 is another chart representing an event processing which in which the spin-loops are long, throughput increases, and the latency also significantly increases.

To illustrate the tradeoffs at the thread synchronization level in relation to units of work, charts representing event processing systems are illustrated in FIG. 2 to FIG. 5. In these charts, a producer thread and a consumer thread are illustrated on the left side and right side, respectively; and a horizontal row represents a unit of work. Naturally, it is understood how threads are actually executed by a CPU, however, this is a convenient representation. In FIG. 2, signal and wait are used with no spin loops and the rate of event production is similar to the rate of consumption. In FIG. 3, spin-loops are short and the fallback to signaling occurs nearly all of the time. In FIG. 4, the spin loop is well sized and the signal( ) call can be avoided. In FIG. 5, the spin-loops are long, throughput increases, and the latency also significantly increases. Each of these charts is referred to in the following discussion.

The signal-wait implementation is efficient at very low event rates. However, if the rate of event production is similar to the rate of consumption, then a significant portion of the producer's time is spent in signaling as shown in FIG. 2. FIG. 2, which is a chart 201 representing an event processing system, illustrates a producer thread and a consumer thread on the left side and right side, respectively. The producer thread will create an event, push the event onto the queue (Q_push), which results in a mutex operation take a lock, and a mutex operation add to queue, signaling the consumer thread, unlocking, and noting a Q_push( ) competed. Meanwhile, the consumer thread has been checking whether the queue is empty (Q_pop), resulting in waiting for an event (wait( )), taking a lock, removing the event from the queue, returning a Q_pop complete, and then consuming the event. Because the rate of event production is similar to the rate of consumption, it happens that the producer thread will create another event, push the event onto the queue (Q_push), which results in a mutex operation take a lock, and a mutex operation add to queue, signaling the consumer thread, and unlocking. Again, meanwhile, the consumer thread has been checking whether the queue is empty (Q_pop), resulting in waiting for an event, taking a lock, removing the event from the queue, returning Q_pop complete, and then consuming the event.

The throughput in FIG. 2 is 2 events in 36 units; that is, a throughput rate of 5.6 events per hundred units. The average latency is 12 units.

If spin-loops are too short, then the spin loop is ineffective because the fallback to signaling occurs nearly all of the time as shown in FIG. 3. In the chart 301 of FIG. 3, the producer thread will create an event, push the event onto the queue (Q_push), which results in a mutex operation to take a lock, add to queue, signaling the consumer thread once the event is added to the queue, unlocking, and noting a Q_push( ) competed. Meanwhile, the consumer thread performs a Q_pop, which results in checking whether the queue is empty, executing a spin-loop (because the queue is empty), checking again whether the queue is empty (it is empty), resulting in waiting for an event (wait( )) until signaled, taking a lock, removing the event from the queue, and returning a Q_pop complete; the consumer thread then consumes the event. Because the spin loop is shorter in comparison to how often events are pushed onto the queue by the producer thread, the consumer thread still had to wait for the event after the spin loop. Now, the producer thread will again create an event, push the event onto the queue (Q_push), which results in a mutex operation to take a lock, add to queue, signaling the consumer thread once added to the queue, unlocking, and noting a Q_push( ) competed. Meanwhile, the consumer thread again looks for another event to consumer, specifically, the consumer thread performs a Q_pop, which results in checking whether the queue is empty, executing a spin-loop (because the queue is empty), checking again whether the queue is empty (it is empty), resulting in waiting for an event (wait( ) and waking up due to the signal( ) by the producer, taking a lock, removing the event from the queue, and returning a Q_pop complete; the consumer thread then consumes the event.

The throughput in FIG. 3 is 2 events in 38 units; that is, a throughput rate of 5.3 events per hundred units. The average latency is 13 units.

If the spin loop is well sized, then the signal( ) call is avoided, which yields more throughput and, counter-intuitively, less latency, as shown in FIG. 4. In the chart 401 shown in this figure, the spin loop is 6 work units, which is the same size as the "create event" function; this is referred to as a "same sized" spin loop. In FIG. 4, the producer thread creates an event, pushes the event onto the queue (Q_push), which results in a mutex operation to take a lock, add to queue, unlocking, and noting a Q_push( ) competed; this is repeated for a second event. Meanwhile, the consumer thread performs a Q_pop, which results in checking whether the queue is empty, executing the same sized spin-loop (because the queue is empty), checking again whether the queue is empty (it is not empty), taking a lock, removing the event from the queue, and returning a Q_pop complete; the consumer thread then consumes the event. Because the spin loop is the same size as the "create event" function, the consumer thread did not need to wait for the event after the spin loop. Now, the consumer thread performs a Q_pop, which results in checking whether the queue is empty, executing the same sized spin-loop (because the queue is empty), checking again whether the queue is empty (it is not empty), taking a lock, removing the event from the queue, and returning a Q_pop complete; the consumer thread then consumes the event.

The throughput in FIG. 4 is 2 events in 23 units; that is, a throughput rate of 8.7 events per hundred units. The average latency is 8 units.

If the spin-loop is too long, then although throughput increases, the latency also significantly increases, as illustrated in FIG. 5. In the chart 501 shown in this figure, the spin loop is 16 work units, whereas the "create event" function is only 6 work units; this is referred to as a "too long" spin loop. In FIG. 5, the producer thread creates an event, pushes the event onto the queue (Q_push), which results in a mutex operation to take a lock, add to queue, unlocking, and noting a Q_push( ) competed; this is repeated for a second event. Meanwhile, the consumer thread performs a Q_pop, which results in checking whether the queue is empty, executing the "too long" spin-loop (because the queue is empty), checking again whether the queue is empty (the queue is not empty and has 2 events), taking a lock, removing one event from the queue, and returning a Q_pop complete; the consumer thread then consumes the event. Now, the consumer thread performs another Q_pop, which results in checking whether the queue is empty (it is not empty), taking a lock, removing the event from the queue, and returning a Q_pop complete; the consumer thread then consumes the event.

The throughput in FIG. 5 is 2 events in 22 units; that is, a throughput rate of 9.1 events per hundred units. The average latency is 16.5 units.

C. Examples of Zero-Order and First-Order Tuning

The Apama 3.0.0.1 CEP platform utilized a spin-loop when sending events. Events were placed on an output queue by one thread, and a batcher (consumer) thread would take events from this queue and send them over network sockets to clients. To amortize the cost of system call overhead, it was desirable to send a batch of events in a single network packet, but maintain low latency as much as possible. This was achieved by having the batcher thread spin for a variable amount of time, tuned to achieve batches between two bounds, and no more than a constant time. Thus, this was zero-order tuning. The problem with this is that it takes no account of the performance of the machine it is running on or the variable cost of the signaling mechanism.

The Apama 4.2.0.0 CEP platform introduced a mechanism whereby the cost of the pthread_signal invocation was measured. The time taken to call pthread_signal (only when a thread was waiting on the condition) was averaged using an exponentially weighted moving average (EWMA). (EWMA has the advantage of being cheap to calculate and only requiring a single value being stored). The spin-loop time was modified such that it was in the region of 4 times the average time taken to execute pthread_signal. Thus, this was first-order tuning. Note that if a producer added an item onto the queue a short period after the previous item was added, within the spin loop time, then the spin loop would still be running and the producing thread would not have to wake up another thread. If a producer added an item onto the queue with a period since the previous item longer than the spin loop time, then the producer thread needs to pay the cost of waking up another thread, because once the consumer finishes the spin loop, it falls back to the wait and signal mechanism. Thus, the highest frequency where the producer has to pay the pthread_signal cost is when the producer adds an item to the queue just after the spin loop has finished. In this worst case, the spin loop timing being a factor of 4 of the cost of the pthread_signal cost means that the producer thread spends at most ¼ of its time executing pthread_signal. (If it produces events more frequently, it does not need to wake up the thread; less frequently, and it will spend a smaller proportion of its time waking up events.) The factor of 4 introduces up to 4 times the latency of the wait-signal case, which is accepted to be a good trade-off for the improved throughput this gives. First-order tuning also means that the system can tune to different platforms; when run on a newer OS with a more efficient implementation of pthread_signal, the whole system benefits; if run on a slower platform, then the system can adjust to compensate. In practice, time between produced events is not constant and may vary, so in practice a producer thread may sometimes need to perform a thread wakeup and other times not—but statistically, these will all average out.

D. Disadvantages of First-Order Tuning

Even with first-order tuning, a tuning factor needs to be picked at compile time which represents a trade-off between throughput and latency. Looking at the Apama 4.2 CEP platform implementation where the spin loop is tuned to be a factor of 4 times the thread signal time, this gives a worse latency than a lower value would have, and a higher value gives higher throughput. It is not possible to choose a mode where both are achieved with first-order tuning because a point on the horizontal axis of the graph in FIG. 1 must be chosen, which yields either poor latency or poor throughput (or both). Essentially a parameter is being chosen which requires the system to spend a certain proportion of its time signaling other threads. That parameter is then fixed, but that is not appropriate for a system in which the load may vary. In high load situations higher efficiency is required so that a smaller proportion of time should be spent signaling, whereas in low load situations, lower latencies are achievable so a higher proportion of time can be spent signaling in order to achieve those low latencies.

III. Problem Presentation

There are problems with the current approaches to spin loops. Spin loops are typically fixed length in some way (no tuning, referred to herein as zero-order tuning of the spin loops). That is, the duration of the spin loop is specified in either cycles of a loop or a time duration. These values may be picked to be optimal for a specific use case on specific hardware, but are unlikely to be suitable on different platforms or even different use cases. First-order tuning measures the cost of certain operations and adjusts the spin loops to some ratio of the measured speed of the operation. These translate well between platforms, but represent a fixed trade-off between latency and throughput.

Conventional systems may make use of historical time to acquire a lock, but not adjusting to the load on the system fails to adapt to current conditions such as actual contention, latency, load on queues, and the like. Known approaches which concentrate on performance of individual locks and attempting to decide based on behavior of individual locks is far too complex and time-consuming. Techniques which utilize a spin counter that is hard coded fail to be adaptable. On the other hand, a simple approach that merely uses of the number of threads which are spinning is an unsophisticated approach that fails to realize why the spin count should (or should not) increase with the number of threads and whether the number of threads is important, and thus merely invents numbers. Furthermore, another known approach which assumes that a thread can spin for the amount of time it takes for a contended critical section fails to be entirely useful for this problem because the contended time varies, and because the approach does not find any reason provided to balance spinning time with contended time.

Thus, the challenge is to pick a length of spin-loop that is optimal. What is optimal can depend on many factors, including platform (both hardware (CPU speed, type, number, memory architecture) and software (operating system, other load on the host at the same time)) and use case (how large is the cost of processing each unit of work that is being passed from one thread to another, which can vary over time). Any value is a trade-off between throughput (achieved by longer spin-loops, achieving better batching and reducing contention) or latency (reducing the amount of time waiting for work to the minimum possible).

IV. Aspects of the Approach

A. Concept—Second-Order Tuning

A system, method, and/or device presented herein can use a set of heuristics to identify which is more desirable, lower latency or higher throughput, given the current state of a system, and can apply those heuristics continuously to dynamically change the spin time employed by the system on potentially short time scales. In a message-processing system such as a Complex Event Processing (CEP) engine, this can be determined by examining the state of various internal queues. If queues are empty or nearly empty most of the time, then the system is under a low throughput load and the system can achieve lower latency. This may represent the "normal" operating mode of a complex event processing (CEP) deployment, for example, performing automated trading on a stock market encountered under normal market conditions. If queues are building up and have a significant amount of events in them, then the system cannot achieve low latency, because events which are queuing will cause latency due to the delay in processing the events while they are sit in queues awaiting a processing thread to process them. In this case, it is better for the system to switch to a higher throughput mode and empty the queues as quickly as possible, even if delays are introduced in passing events from one thread to another; these delays (due to longer spin-loops) are likely to be shorter than the delays introduced by processing events slower (due to a greater proportion of time being spent in waking up other threads).

This switching from low latency to high throughput does not have to be a binary switch—the spin loop ratio can be tuned continuously, to achieve a good balance of throughput and latency under any load conditions. In a variation, it is possible to treat different partitions of the application differently—for example, in a trading application, if all stock symbols are processed in parallel, and some are experiencing high bursts of traffic while others are not, the system could maintain low latency for the majority of symbols while increasing throughput to clear backlogs on the high traffic symbols.

Figure 6:
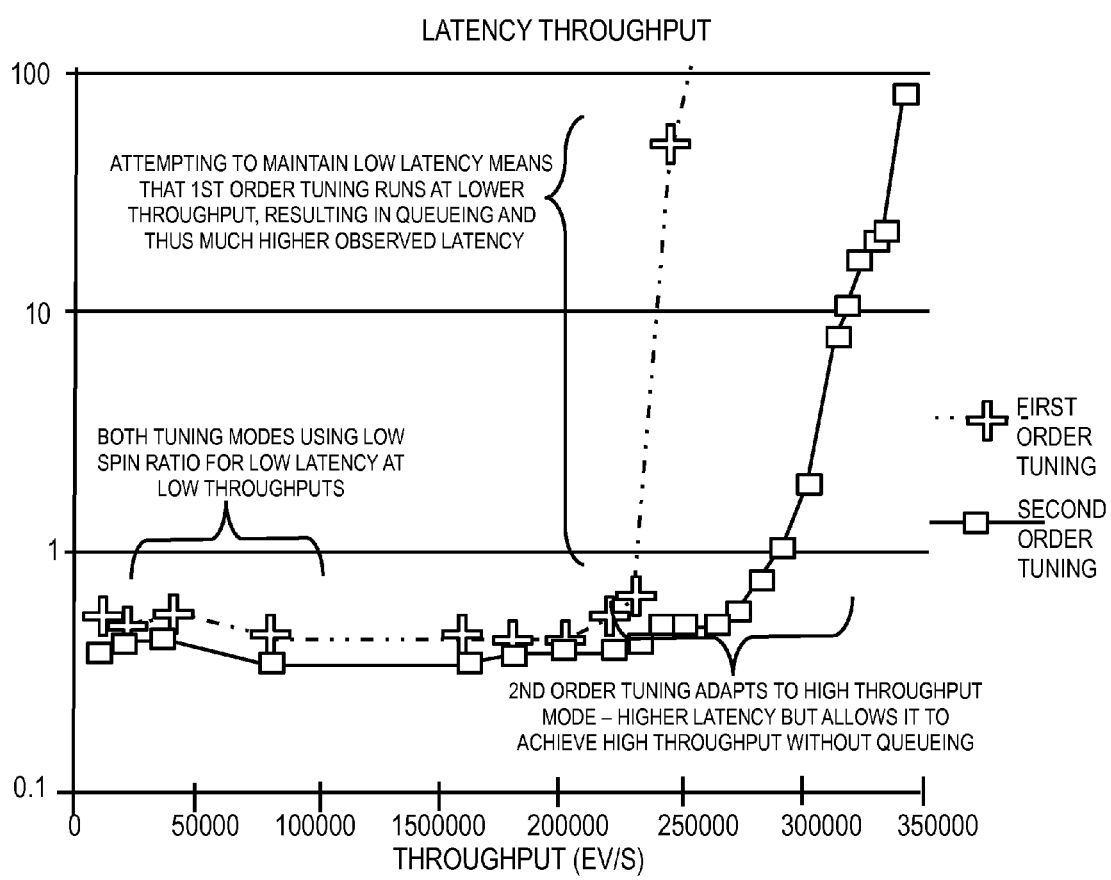
FIG. 6 is another chart illustrating latency at throughput.

Herein, this adaptive system is referred to as "second-order tuning" of spin loop times. Second-order tuning of spin loops gives better latency in the typical low throughput cases and higher throughput under high load. While this comes at the cost of latency, it should be noted that if more events are going into a system than its maximum throughput, then events will accumulate in queues, and the latency of each event is larger than previous events. That is to say, in practical terms, the latency is effectively unbounded. By using second-order tuning of the spin loop time, the maximum throughput is increased, and the latency of event rates between the previous maximum throughput and the new maximum throughput is reduced from unbounded to some value which, while high compared to the low-throughput latency, is still significantly better than the first-order tuning behavior. For example, see FIG. 6, which illustrates the latency (in terms of spin loop to signal time ratio) verses throughput (in terms of thousands of events) of an event processing system. In FIG. 6, first-order tuning is represented by the "+" and second-order tuning is represented by squares. Both first-order tuning and second-order tuning modes can use low spin ratio for low latency at low throughputs, as illustrated in the left side of the graph. The second-order tuning can adapt to a high throughput mode, which has higher latency but allows the system to achieve high throughput without queuing the events, as shown in the lower right side of the graph. The first-order tuning attempts to maintain low latency, which means that the first-order tuning runs at lower throughput, resulting in queuing and thus much higher observed latency, as shown in the upper right side of the graph.

While the examples here discuss the case of a producer thread passing work to a consumer thread, this can be generalized to anywhere that spin loops may be used to avoid contention. The other common area is around mutexes, such as the Linux kernel's futex (Fast mUTEX) implementation. In the mutex case, a thread (referred to as the acquiring thread) wanting to acquire a mutex lock which observes that another thread (referred to as the current owner) already owns the lock will spin. This is done to avoid the acquiring thread entering the scheduler to block, which would require the current owner thread to call the scheduler to wake up the acquiring thread. The spin-loop can be tuned to some ratio of how long the mutex is typically held for. Second-order tuning can be applied to this, by measuring overall contention in the application (a technique is discussed in the implementation), or other measures of the application's load (such as queue size, rate of work coming in, or some other suitable measure), and adjusting the spin-loop ratio to be low if the system is experience low load, or higher for high load.

V. Implementation Examples

In the Apama CEP system, the average queue size is measured of both internal queues for each worker thread (context). The system can use, for example, a EWMA for the advantages of simplicity of state and execution speed. The system can give extra weighting to the queues of contexts that are ready to run but not currently run-able. The scheduler can have a single run queue for the entire process. The inventors have observed the single run queue becoming a contention bottleneck when run on wide machines (e.g. four CPU sockets, more than 100 hardware threads). The contention on the mutex is measured (by attempting to lock the mutex with a zero timeout—if this operation times out, then it is known that there is contention—and fallback to locking the mutex unconditionally, maintaining a EWMA of what proportion of mutex acquisitions caused contention). A ratio then can be calculated combining these factors and can be used to calculate the spin time in the following way.

Calculation of Spin Time

Let L be the load on the system, as measured by the number of events on all the queues in the system and number of runnable contexts.

Let C be the moving average of the time taken to signal another thread (EWMA) R is the desired ratio of spin time to signal time If L<100:

$R=3$

If 100<=L<1000:

$R=3*L/100$

If L>=1000:

$R=30$

And this ratio is used to calculate the spin time T in this way:

$T=R*C$

In this example, this means the ratio varies between 3 and 30 as the load varies, meaning that at high loads we are prepared to spend 3.3% of the time signaling but under low loads we are prepared to spend as much as 33% of the time signaling. At low loads (under 100) the ratio is fixed at 3 and similarly at high loads (over 1000) the ratio is fixed at 30 but between those two loads the ratio is varied continuously so the system does not simply switch between two modes. Now we see that R, rather than being fixed is a function of L, R(L). This function could be changed to some other form but a central point is that the ratio should be a function of the load, measured in some way. In other implementations, values other than these used in the example calculation can be used.

Figure 7:
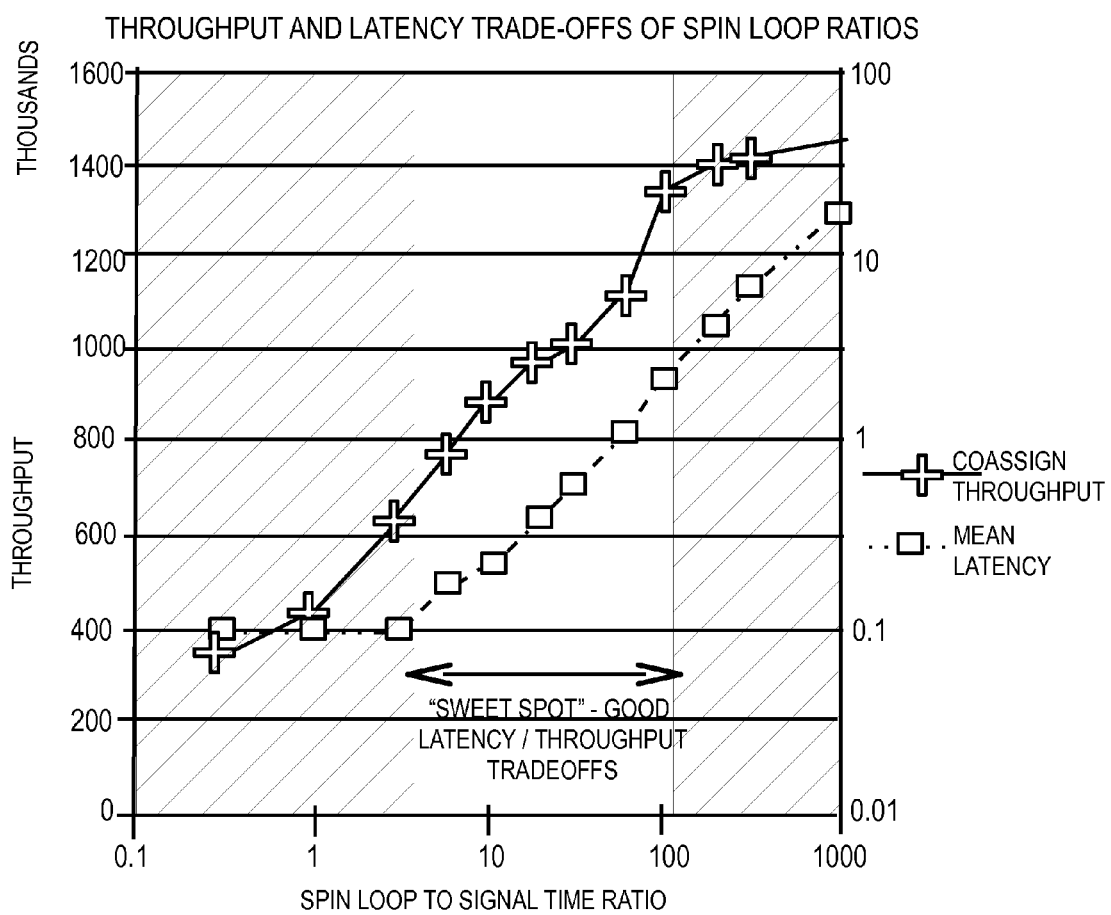
FIG. 7 is another chart illustrating throughput and latency trade-offs of spin loop ratios, showing a "sweet spot."

Note that in the graph shown in FIG. 1, diminishing returns are seen for small and large values. That is, very low spin-loop values (on the left side of the graph) continued to reduce throughput with little improvement in latency, and similarly, very high values (on the right side of the graph) gave little increase in throughput while continuing to increase latency, as shown by the shaded areas on the left and right sides of the graph in FIG. 7 which corresponds to the graph of FIG. 1. Thus, the computed spin loop ratio is limited to the range where benefits exist, a so-called "sweet spot" illustrated in FIG. 7 where there are good latency/throughput tradeoffs. The spin-loop time is then modified so that it is (approximately) equal to the spin ratio multiplied by the EWMA of the measured time taken to perform a thread wake-up. This is how the upper and lower limits to the ratio (30 and 3 in the example) can be chosen to ensure nearly optimal throughput/latency tradeoff.

Computing this value can itself be costly and can adversely affect throughput and latency. The system thus can measure how long it takes to compute the value, and only calculate the value periodically. The period at which the value is calculated can be a constant ratio of the signal time. Thus the rate at which the second-order tuning ratio is computed can itself be limited by a first-order tuning.

This implementation works with a single scheduler run queue, but can easily be extended to multiple scheduler run queues, for example, in a work-stealing scheduler (which attempts to scale the scheduler up by splitting it into multiple partitions, only introducing cross-partition communication if one partition becomes idle). While such a multiple run queue scheduler may scale well on a very wide machine, we note that the second-order tuning using the heuristic of contention on the run queue can automatically tune the scheduler so it scales well across wider machines, although at the cost of slightly increased latency under a very heavy load. If a multiple run queue scheduler implementation is used, the engine may also choose to use the same heuristics to divide work between the scheduler run queues—maintaining a "heavy load" scheduler and a "light load" scheduler, such that one will automatically tune itself to high throughput while another tunes to low latency.

Example

In a CEP deployment, a CEP engine may be examining all trades made in a market for fraudulent activity. The majority of the time, the queues within the CEP system are empty or nearly empty, as the incoming event rate is much lower than the maximum event rate that the system can handle. Output events are generated one at a time, and are passed onto an output queue which another thread pulls off to send out of the system. In this mode, the threads pulling from the output queue use spin loops that are tuned to be short. This means that small batches, typically of a single event, are taken from the output queues and processed quickly. On average, a small number of threads are running concurrently, as many are idle, so there is low contention on mutexes. There is relatively high overhead for locking and queue transfer for each worker generating output events compared to processing, but the system has capacity to spare, so that is not a problem. The system responds with low latencies, and behaves as shown in FIG. 8.

Figure 8:
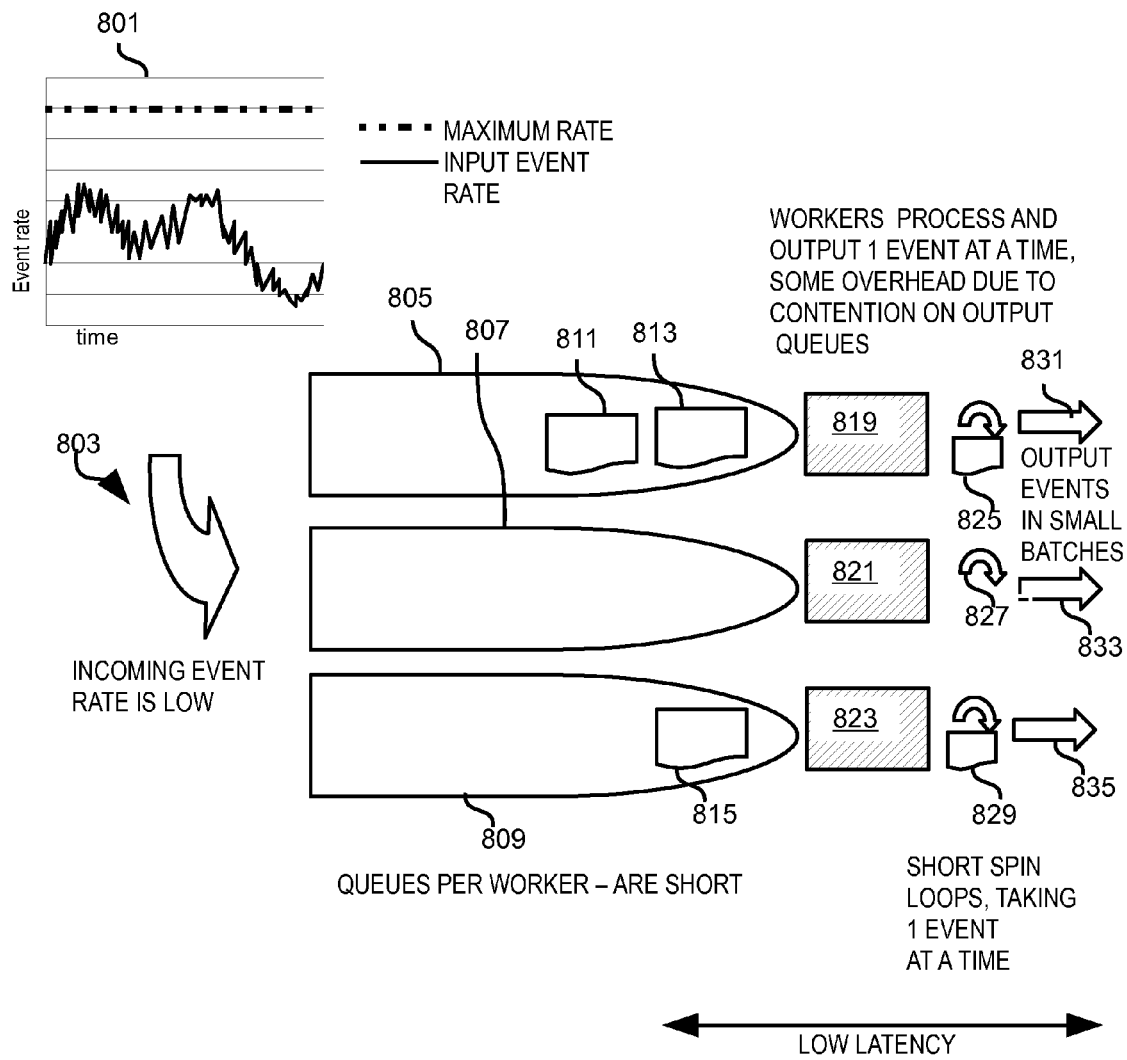
FIG. 8 is a block diagram illustrating second-order tuning in a case of low throughput and low latency.

Referring to FIG. 8, a block diagram illustrating second-order tuning in a case of low throughput and low latency has a low input event rate incoming for processing, as shown in the event rate/time chart 801. The input event rate over time here is well below the maximum rate. Consequently, the incoming event rate 803 into the multithreaded system is low. The multithreaded system includes threads (also referred to as "workers"). Here, each thread has a queue 805, 807, 809 per worker; each of the queues has zero to two events 811, 813, 815. The workers can process and output one event at one time block 819, 821, 823, with some overhead due to contention on the output queues. The system has short spin loops 825, 827, 829, each of which takes only one event at a time. Accordingly, the events are output 831, 833, 835 in small batches of one at a time. There is a low latency from the time when the event 813, 815 arrives at the front of the queue 805, 809 and is picked up to be processed, until the event is output 831, 835. Naturally, the numbers of workers/threads and events are representative and may differ in practice.

Figure 9:
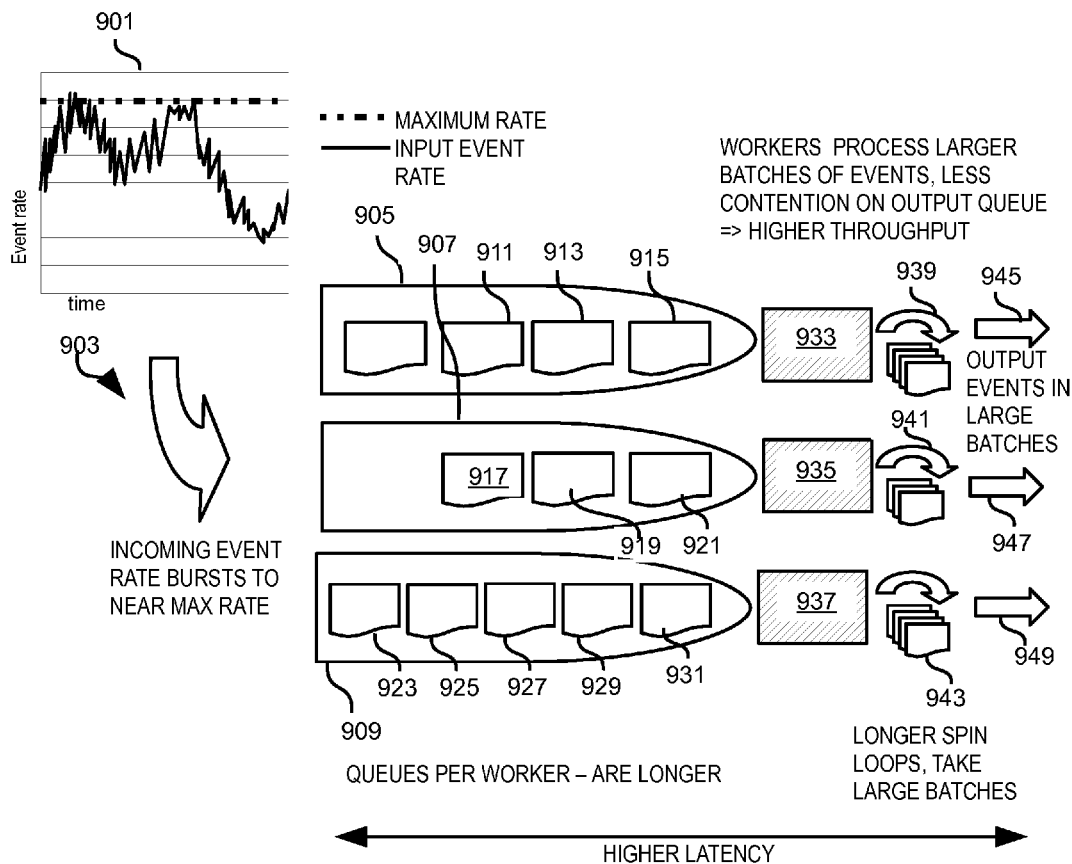
FIG. 9 is a block diagram illustrating second-order tuning in a case of high throughput and high latency.

When exceptional market conditions occur, the event rate increases, and reaches or even, for short periods, exceeds the maximum event rate that the system can handle. In these cases, the queues start to fill up and more threads are running concurrently, so mutex contention will increase. These effects are measured and thus the spin loop time is increased by the second-order tuning mechanism. These result in more time between the output queues having events taken from them—thus larger batches taken from the output queues and consequently, a smaller proportion of the worker thread's time being spent in interacting with the queues, as most of the time it does so without contention. This is shown in FIG. 5, which of the different spin-loop lengths shown achieved the highest throughput for the producer (which in our example CEP deployment are the workers generating output events), and represents the right hand side of the graph shown in FIG. 1. The example CEP system under high load is shown in FIG. 9. The longer spin loop times result in higher latency, but the larger batches result in higher throughput. This means that the system can keep up—whereas with first-order or zero-order tuning, the spin loop times must be chosen to either handle the high bursts of activity or achieve lower latency.

Referring to FIG. 9, a block diagram illustrating second-order tuning in a case of high throughput and high latency illustrates a high rate of events over time, as shown in the event rate/time chart 901. The input event rate over time here is bursts to near the maximum rate. Consequently, the incoming event rate 903 into the multithreaded system is bursty and near the maximum event rate. Each thread has a queue 905, 907, 909 per worker; each of the queues in this example as three to five events 911-931, which can be representative of even more events. The workers can process larger batches of events at a single time block 933, 935, 937, with less contention on the output queue, resulting in higher throughput. The system has longer spin loops 933, 935, 937, which results in a consumer thread such as the workers 905, 907, 909 in this example being able to take plural events at a time, for example, all of the events in the queue for that thread. Accordingly, the events are output 945, 947, 949 in larges batches at a time. There is a higher latency from the time when the events 911-931 in their respective queue are picked up to be processed, until each batch of events is output 945, 947, 949. The numbers of workers/threads and events are representative and may differ in practice.

Variation—Second-Order tuning of other performance values

Similar trade-offs can be made in runtime systems that use co-operative scheduling. Here, the runtime can intermittently examine the global state of the system to determine if other work needs to be executed, pausing the currently executing thread of execution. If this check is made too frequently, the throughput is impacted, because a larger proportion of time is spent performing the checks. If this check is made too infrequently, jitter is experienced as the context switching between jobs is such that some jobs make no progress for long periods of time, introducing latency.

Similarly to spin-loops, first-order tuning of this can be achieved by measuring the time taken to perform this re-scheduling check, and ensuring that the period between re-scheduling checks is a constant ratio of the time taken to perform the check. And second-order tuning can be applied, such that if the system as a whole has a large amount of outstanding work, then it can favor throughput over latency in order to clear its backlog of work. If there is little total work in the system, then the period between re-scheduling checks can be reduced to improve latency.

Figure 10:
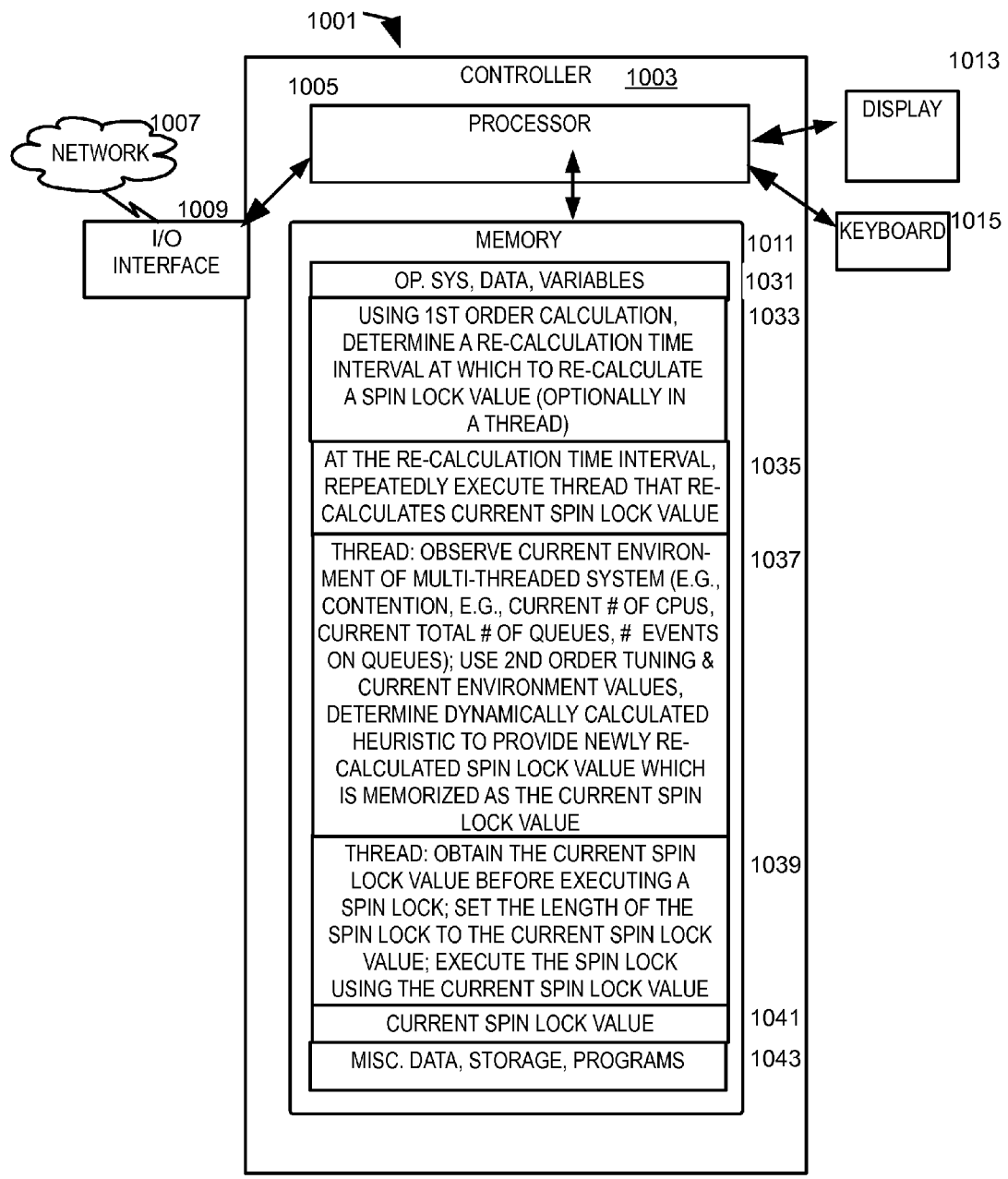
FIG. 10 is a block diagram illustrating portions of a computer.
Figure 11B:
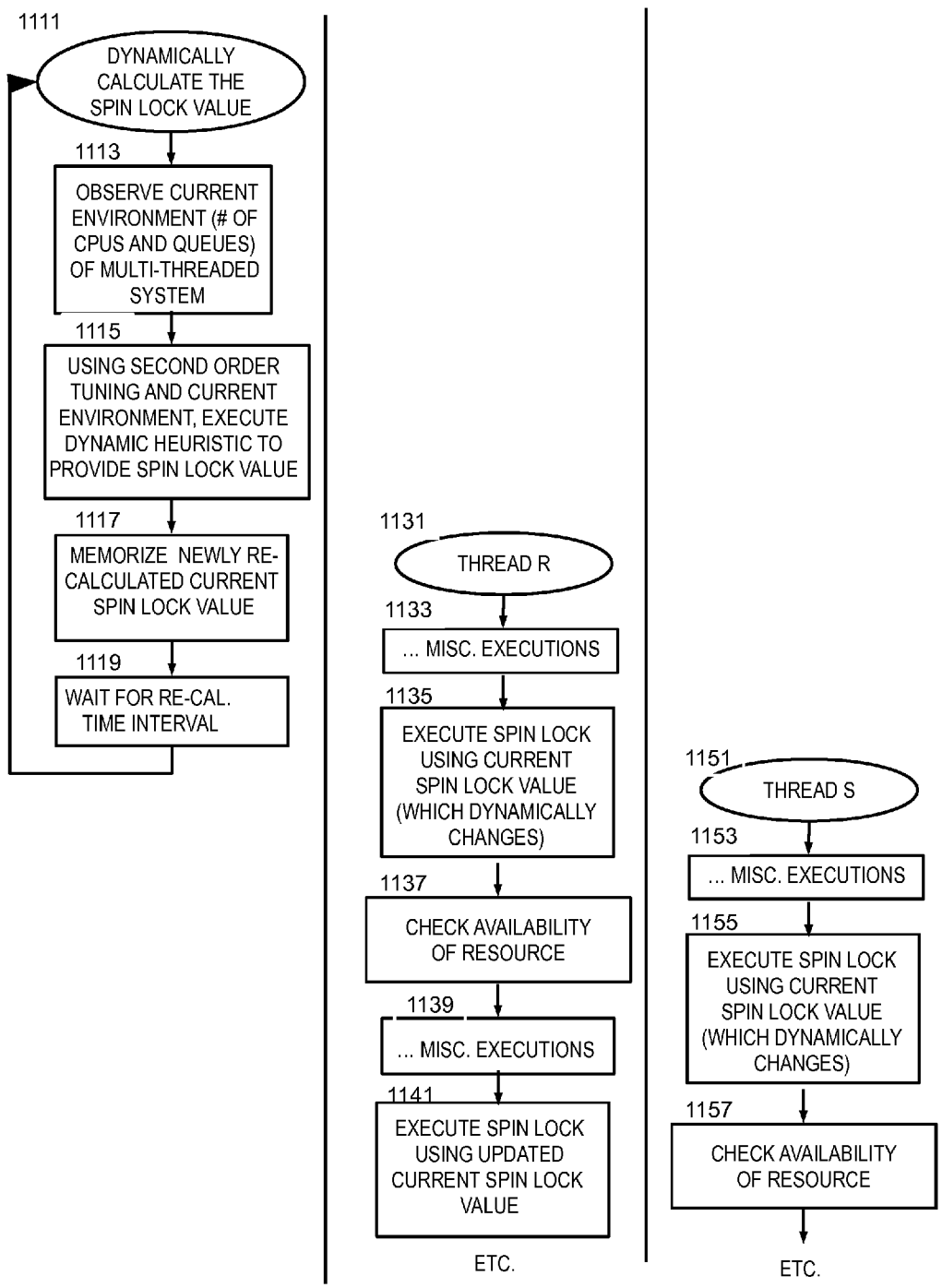

This section will discuss additional concrete examples of implementation. FIG. 10 illustrates a computer implementation. FIG. 11A to FIG. 11B collectively illustrates a procedure for second-order tuning, which conveniently may be implemented on the computer of FIG. 10, or any another apparatus which is appropriately configured.

Reference is now made to FIG. 10, a block diagram illustrating relevant portions of a computer 1001, on which is provided a computer-implemented device for a tuned spin count in a multithreaded system. The computer 1001 may include one or more controllers 1003, a processor 1005, an input/output (i/o) interface 1009 for communication such as over a network 1007, a memory 1011, a display 1013 (optional), and/or a user input device (also optional) such as a keyboard 1015. Alternatively, or in addition to the keyboard 1015, a user input device may comprise one or more of various known input devices, such as a keypad, a computer mouse, a touchpad, a touch screen, a trackball, and/or a keyboard. The display 1013 may present information to the user by way of a conventional liquid crystal display (LCD) or other visual display, and/or by way of a conventional audible device (for example, a speaker) for playing out audible messages. Portions of the computer 1001 are well understood to those of skill in this area and have been omitted to avoid obscuring the discussion.

The processor 1005 may comprise one or more microprocessors and/or one or more digital signal processors. The memory 1011 may be coupled to the processor 1005 and may comprise a read-only memory (ROM), a random-access memory (RAM), a programmable ROM (PROM), and/or an electrically erasable read-only memory (EEPROM). The memory 1011 may include multiple memory locations for storing, among other things, an operating system, data and variables 1031 for programs executed by the processor 1005; computer programs for causing the processor to operate in connection with various functions such as to determine 1033 a re-calculation time interval at which to re-calculate a spin lock value; repeatedly execute 1035 a spin-loc-re-calculation that re-calculates the current spin lock value; in a spin-lock-re-calculation 1037, observe the current environment of the multi-threaded system and determine a dynamically calculated heuristic to provide a newly re-calculated spin lock value to be used as the current spin lock value; and, in another thread 1039, obtain the current spin lock value and execute a spin lock using the current spin lock value for the length of the spin lock. The computer programs may be stored, for example, in ROM or PROM and may direct the processor 1005 in controlling the operation of the computer 1001. Each of these functions is considered in more detail below, to the extent that it is not detailed elsewhere in this document.

Responsive to manual signaling from the user input device represented by the keyboard 1015, in accordance with instructions stored in memory 1011, and/or automatically upon receipt of certain information via the i/o interface 1009, the processor 1005 may direct the execution of the stored programs.

The processor 1005 may be programmed to determine 1033 a re-calculation time interval at which to re-calculate a spin lock value. A process, initialization routine, and/or thread, can use a calculation, for example, a first-order calculation such as those described above, to determine a re-calculation time interval at which to re-calculate a spin lock value. The first-order calculation can be based on the cost of certain operations, with the spin loop adjusted to be some fixed ratio of some measurement. The certain operations which are measured can include: (A) those that are hoped to be avoided, e.g., cache misses, lock acquisition latency, and the like; and/or (B) time taken to perform the re-calculation of the spin lock value, to ensure that the period between re-calculations is a constant ratio of the time taken to perform the re-calculation. Alternatively, a zero-order calculation may be used. Having once calculated the re-calculation time interval, it is not necessary to again re-calculate the re-calculation time interval.

The processor 1005 may be programmed to repeatedly execute 1035, at the re-calculation time interval, a spin-lock-re-calculation that re-calculates the current spin lock value. The repeated execution can be performed using conventional techniques, such as implementing the spin-lock-re-calculation as a re-calculation thread (optionally dedicated), implementing the spin-lock-re-calculation as a separate process or part of a separate process, implementing the spin-lock-re-calculation as a subroutine, and/or implementing the spin-lock-re-calculation in other known ways, in which the spin-lock-re-calculation (here, represented as a spin-lock-re-calculation thread 1037) is scheduled to be executed at the re-calculation time interval. For example, there can be provided a procedure that calls the re-calculation thread 1037 (representative of the spin-lock-re-calculation) at the specific re-calculation time interval, or having the re-calculation thread 1037 (representative of the spin-lock-re-calculation) in a loop with a sleep cycle at the re-calculation time interval, and the like. Techniques for repeated execution of a process, subroutine, calculation, and/or thread and the like will be known to those of skill in the art.

The processor 1005 may be programmed to, in the spin-lock-re-calculation (represented by the re-calculation thread 1037), observe the current environment of the multi-threaded system and determine a dynamically calculated heuristic to provide a newly re-calculated spin lock value to be used as the current spin lock value. The current environment of the multi-threaded system which is observed is the amount of contention on a run queue of the OS scheduler of the multi-threaded system. Techniques are known for obtaining a value indicating the amount of contention. In an embodiment, the current environment can be observed based as the current number of CPUs, current total number of queues, total number of events on the queues, and similar. In another embodiment, the current environment can be observed from the load on the multithreaded system as measured by the actual number of events currently on all event queues internal to all threads currently in the multithreaded system, the actual number of currently runnable contexts in the multithreaded system, and time it takes to signal another thread (time for signaling another thread can be a running actual average for a signal( ) operation, or an average for cooperative scheduling operations and/or thread synchronization primitives). Consequently, the current environment reflects the immediate amount of contention based on the incoming event rate and actual ability of the system to process the incoming event rate and not a historical amount of contention. Accordingly, an input event rate that bursts to a near maximum rate can be immediately reflected in the current spin lock value. Furthermore, the spin-lock-re-calculation uses the current environment values which were observed (at the current time) in a second-order tuning which adapts to a low throughput mode, and a high throughput mode which has higher latency but allows the system to achieve high throughput without queuing the events (such as those discussed previously), to determine a dynamically calculated heuristic that provides the newly-recalculated spin lock value, which is thus based on the current environment and actual load, latency, and contention for resources, at the moment in time when re-calculated. The newly re-calculated spin lock value is then memorized, such as in the current spin lock value 1041 storage, so that it is used by other threads in determining how long their spin locks should be. Accordingly, the newly re-calculated spin lock value is updated from time-to-time at the re-calculation time interval.

The processor 1005 may be programmed to, in another thread 1039 (which is representative of any number of other threads), which is about to execute a spin lock, obtain the current spin lock value 1041 such as from the storage, and execute a spin lock using the current spin lock value for the length of the spin lock. This can conveniently be implemented by including these functions within a spin-lock primitive which is called by the thread. As another example implementation, the thread itself can retrieve the current spin lock value 1041 which is memorized just before calling a spin lock, and can pass the current spin lock value to the spin lock primitive to use as the length of the spin lock. It is understood that the other thread 1039 is representative of a plurality of threads which are executed in accordance with conventional techniques from time-to-time by the multi-threaded system and may include additional functionality.

The memory 1011 can include a location at which the current spin lock value 1041 is memorized by the spin-lock-re-calculation, and from which other threads that are executing a spin lock can retrieve the current spin lock value immediately before a thread executes a spin lock.

As will be understood in this field, besides the functions discussed above, the memory 1011 can include other miscellaneous information in a miscellaneous data storage 1043, along with the usual temporary storage and other instructions for other programs not considered herein.

The computer 1001 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1005, memory 1011, a disk drive and/or removable storage medium are referred to as "computer-readable storage media" and provide non-transitory storage of computer programs and data.

It should be understood that FIG. 10 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

FIG. 11A-11B (collectively referred to as FIG. 11) provide an illustration of a procedure for second-order tuning. Most of the details implicated by FIG. 11 have been discussed above and are not repeated herein. However, FIG. 11 is useful to illustrate the procedure and provide a more complete understanding.

By way of overview, an interval-determination procedure 1101 initially determines the re-calculation time interval. Then, a spin-lock-re-calculation is repeatedly executed at the re-calculation time interval that was calculated by the interval-determination procedure 1101. The spin-lock-re-calculation, here represented by re-calculation thread 1111, is a process, part of a process, subroutine, thread, or the like, that observes the current environment and uses second-order tuning to dynamically calculate the spin lock value; the spin-lock-re-calculation provides a current spin lock value which, because the spin-lock-re-calculation is repeatedly executed, is continually tuned on a periodic basis to provided best results for the actual current load on the multi-threaded system. Other threads, here represented by thread R 1131 and thread S 1151, are called to be executed according to known techniques and, when they perform a spin lock, use the current spin lock value which is changed from time-to-time by the spin-lock-re-calculation. Each of these is now discussed in more detail, omitting some details previously provided.

The interval-determination procedure 1101 initially determines the re-calculation time interval, using a first-order tuning, which determines the re-calculation time interval at which the spin lock value will be repeatedly re-calculated by the spin-lock-re-calculation. The interval-determination procedure 1101 may or may not be a thread.

Then, the spin-lock-re-calculation (here, represented by re-calculation thread 1111) is repeatedly executed at the re-calculation time interval that was calculated by the interval-determination procedure 1101. In this flow chart, the repeated execution is represented as a non-ending loop which includes a wait 1119 for the re-calculated time interval; alternative implementations will be appreciated by those of skill in the art. The spin-lock-re-calculation (represented by re-calculation thread 1111) will observe 1113 the current environment; use 1115 second-order tuning and the current environment information to execute a dynamic heuristic that calculates the spin lock value. Then, the spin-lock-re-calculation will memorize 1117 the newly re-calculated spin lock value, as the current spin lock value. Because the spin-lock-re-calculation is repeatedly executed, the current spin lock value is continually tuned on a periodic basis to the actual current load on the multi-threaded system, and threads which spin for a length of the current spin lock value will be adapted to the "sweet spot" (referred to in FIG. 7) with good latency/throughput tradeoffs. The procedure of FIG. 11 results in handling not only low throughput, low latency situations (as illustrated in FIG. 8), but also immediately results in setting threads up to handling high throughput, high latency situations (as illustrated in FIG. 9).

Other threads, here represented by thread R 1131 and thread S 1151, are called to be executed according to known techniques. Typically, but not necessarily, the other threads 1131, 1151 are producer threads that execute the spin-loop, in combination with checking whether events exist on a queue and consuming the events on the queue.

Thread R 1131 can execute instructions 1133, typically including a check on the availability of a resource shared with other threads. When the thread 1131 performs a spin lock (for any reason, such as because the resource is not yet available), the thread executes 1135 the spin lock using, for the length of the spin lock, the current spin lock value, which is being changed by the spin-lock-re-calculation on a period basis to reflect the current situation. Typically, but not necessarily, after the spin lock is executed, the next step is to check 1137 availability of the resource or use the resource. Other instructions 1139 can follow. Meanwhile, because the spin-lock-re-calculation is repeatedly executing, the current spin lock value has been updated to reflect the new, current situation which may have changed. In this example, subsequent instructions include a further execution 1141 of a spin lock using the updated current spin lock value.

Thread S 1151 is included in this figure as representative of the plural different threads that can be executed at different times, and meanwhile the current spin lock value is continually re-calculated at periodic re-calculation time intervals, so that the current spin lock value changes as threads come and go and queues of threads are filled and emptied of events. Thread S 1151 can execute instructions 1153. When the thread 1151 performs a spin lock, the thread executes 1155 the spin lock using, for the length of the spin lock, the current spin lock value. The thread S 1151 executes other instructions after the spin lock is completed, in this example to check 1157 availability of a resource. Other instructions can follow.

VI. Glossary

Terms as used herein are intended to be interpreted first, as understood to one of skill in the art at a first level, of thread management within operating systems; and if not interpretable at the first level, then at a second level as understood to one of skill in the art of computer science; and then if not interpretable according to the first level and second level, according to a more general dictionary.

The claims may use the following terms, which are defined to have the following meanings for the purpose of the claims herein. Other definitions may be specified in this document.

The term "mutex" refers to a MUTual EXclusion lock, which is a known thread synchronization primitive that only one thread at a time may lock. Attempting to lock when another thread holds the lock will block until the lock is released. Access by multiple threads can cause contention.

The term "contention" refers to a known situation where two cores (or OS threads) are trying to access the same resource. The CPUs typically invalidate their caches or the resource being contended, significantly reducing throughput.

The term "throughput" means the rate at which an application can process units of work.

The term "latency" is used to mean the time between a unit of work being submitted to an application and that unit of work's result being made available.

The term "batching" or "batch" refers to a conventional technique whereby multiple pieces of work are processed together. This can reduce contention and improve throughput, but at the cost of latency, because work may be delayed until a batch is filled.

The designation "condition variable" means a conventional thread synchronization primitive that allows one thread to wait on a condition, at which point it blocks until signaled by another thread. A "condition variable" is typically associated with a mutex and some state.

The designation "spin loop" is used to refer to small loop which iterates many times for the purpose of causing a small delay in processing.

The term "sleep" is used to refer to a conventional request which can be submitted to the OS scheduler for the current thread to pause execution, to be resumed after a specified amount of time. Typically, in the "sleep" request, relatively coarse-grained time periods are supported (in excessive of 10 milliseconds).

The designation "OS scheduler" is used to refer to the conventional part of the operating system kernel responsible for running threads across CPU cores; among other things, the OS scheduler controls which threads are running and which are blocking.

The designation "EWMA" or "Exponentially weighted moving average" refers to a conventional technique in which a simple averaging mechanism is controlled by a ratio; the value of a EWMA can be calculated as: (last_result*ratio)+previous_ewma_value*(1−)

The designation "co-operative scheduling" refers to a conventional mechanism for scheduling a number of parallel units of work across a smaller number of threads or CPU cores where the runtime will intermittently check if other units need to run, and if so, pause execution of one and start executing another unit.

The term "producer" as used herein refers to a thread that is providing work (such as events or messages) to a consumer thread; the producer generally will ensure that the consumer will process the work within a suitably short amount of time.

The term "consumer" as used herein refers to a thread that is processing work provided by a producer; when there is no work available, the consumer thread should wait until there is work available.

The term "wait" used specifically in the context of an operation call refers to a known operation on a condition variable or semaphore which results in suspending execution of the calling thread which made the "wait" call until a signal is called on the object. (Some terminologies use the designation "acquire" or "block"). A "wait" operation is complementary to the "signal" operation.

The term "signal" or "signaling" used specifically in the context of an operation call refers to an operation on a condition variable or semaphore which results in waking up a thread or threads waiting (pursuant to a "wait" operation) on the object. (Some terminologies use the designation "release" or "post"). A "signal" operation is complementary to the "wait" operation.

The term "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

VII. Implementations and Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for second-order tuning of spin loops have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The computer and/or system embodied in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for any information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for a tuned spin count in a multithreaded system, comprising:
   determining, in a processor, a re-calculation time interval at which to re-calculate a current spin lock value;
   repeatedly executing, by the processor, at the re-calculation time interval, a spin-lock-re-calculation that performs steps of:
      observing a current environment of the multithreaded system,
      determining, using a second-order tuning and values of the current environment, a dynamically calculated heuristic to provide the newly-recalculated spin lock value, and
      memorizing the newly re-calculated spin lock value, in a memory cooperatively operable with the processor, as the current spin lock value; and
   obtaining, by the processor, in at least one thread, the current spin lock value which is memorized in the memory, and executing a spin lock in the at least one thread using the current spin lock value to set a length of the spin lock.

2. The method of claim 1, wherein the re-calculation time interval at which the spin-lock-re-calculation is executed to observe the current environment is calculated as a constant ratio of a signal call time.

3. The method of claim 1, wherein the re-calculation time interval is determined using a first-order tuning which uses an exponentially weighted moving average (EWMA) of time taken to signal another thread.

4. The method of claim 1, wherein the current environment which is observed by the spin-lock-re-calculation and used to determine the newly-recalculated spin lock value is: contention on a run queue of an OS scheduler of the multithreaded system.

5. The method of claim 1, wherein the current environment which is observed by the spin-lock-re-calculation and used to determine the newly-recalculated spin lock value is: load on the multithreaded system as measured by actual number of events currently on all event queues internal to all threads currently in the multithreaded system; actual number of currently runnable contexts in the multithreaded system; and moving average of time taken to signal another thread.

6. The method of claim 1, wherein the spin-lock-re-calculation that is executed to provide the current spin lock value is executed on a dedicated thread.

7. A computer that provides a tuned spin count in a multithreaded system, comprising:
   a memory, which is configured to store a current spin lock value; and
   a processor cooperatively operable with the memory, and configured to:
      determine a re-calculation time interval at which to re-calculate a current spin lock value;
      repeatedly execute, at the re-calculation time interval, a spin-lock-re-calculation that:
         observes a current environment of the multithreaded system,
         determines, using a second-order tuning and values of the current environment, a dynamically calculated heuristic to provide the newly-recalculated spin lock value, and
         memorizes the newly re-calculated spin lock value in the memory as the current spin lock value; and
      obtain in at least one thread, the current spin lock value which is in the memory, and executing a spin lock in the at least one thread using the current spin lock value to set a length of the spin lock.

8. The computer of claim 7, wherein the processor is further configured that the re-calculation time interval at which the spin-lock-re-calculation is executed to observe the current environment is calculated as a constant ratio of a signal call time.

9. The computer of claim 7, wherein the processor is further configured that the re-calculation time interval is determined using a first-order tuning which uses an exponentially weighted moving average (EWMA) of time taken to signal another thread.

10. The computer of claim 7, wherein the processor is further configured that the current environment which is observed by the spin-lock-re-calculation and used to determine the newly-recalculated spin lock value is: contention on a run queue of an OS scheduler of the multithreaded system.

11. The computer of claim 7, wherein the processor is further configured that the current environment which is observed by the spin-lock-re-calculation and used to determine the newly-recalculated spin lock value is: load on the multithreaded system as measured by actual number of events currently on all event queues internal to all threads currently in the multithreaded system; actual number of currently runnable contexts in the multithreaded system; and moving average of time taken to signal another thread.

12. The computer of claim 7, wherein the processor is further configured that the spin-lock-re-calculation that is executed to provide the current spin lock value is executed on a dedicated thread.

13. A non-transitory computer readable medium comprising executable instructions for a method for a tuned spin count in a multithreaded system, the instructions being executed by a processor to perform:
   determining a re-calculation time interval at which to re-calculate a current spin lock value;
   repeatedly executing, at the re-calculation time interval, a spin-lock-re-calculation that performs steps of:
      observing a current environment of the multithreaded system,
      determining, using a second-order tuning and values of the current environment, a dynamically calculated heuristic to provide the newly-recalculated spin lock value, and memorizing the newly re-calculated spin lock value, in a memory cooperatively operable with the processor, as the current spin lock value; and obtaining, in at least one thread, the current spin lock value which is memorized in the memory, and executing a spin lock in the at least one thread using the current spin lock value to set a length of the spin lock.

14. The non-transitory computer readable medium of claim 13, wherein the re-calculation time interval at which the spin-lock-re-calculation is executed to observe the current environment is calculated as a constant ratio of a signal call time.

15. The non-transitory computer readable medium of claim 13, wherein the re-calculation time interval is determined using a first-order tuning which uses an exponentially weighted moving average (EWMA) of time taken to signal another thread.

16. The non-transitory computer readable medium of claim 13, wherein the current environment which is observed by the spin-lock-re-calculation and used to determine the newly-recalculated spin lock value is: contention on a run queue of an OS scheduler of the multithreaded system.

17. The non-transitory computer readable medium of claim 13, wherein the current environment which is observed by the spin-lock-re-calculation and used to determine the newly-recalculated spin lock value is: load on the multithreaded system as measured by actual number of events currently on all event queues internal to all threads currently in the multi-threaded system; actual number of currently runnable contexts in the multithreaded system; and moving average of time taken to signal another thread.

18. The non-transitory computer readable medium of claim 13, wherein the spin-lock-re-calculation that is executed to provide the current spin lock value is executed on a dedicated thread.

* * * * *

UNITED STATES PATENT AND TRADEMARK OFFICE
CERTIFICATE OF CORRECTION

| | | |
|---|---|---|
| PATENT NO. | : 9,262,233 B1 | Page 1 of 1 |
| APPLICATION NO. | : 14/503754 | |
| DATED | : February 16, 2016 | |
| INVENTOR(S) | : Reed et al. | |

It is certified that error appears in the above-identified patent and that said Letters Patent is hereby corrected as shown below:

In the Specification

Column 5, before line 12 beginning "Improve adaptation of max spinning", a start of table indication should appear as follows:
-- ▬▬▬▬▬▬▬▬▬▬▬▬▬▬▬▬▬▬▬▬▬▬ --

Column 5, after lines 25-26 ending "(see below)", an end of table indication should appear as follows:
-- ▬▬▬▬▬▬▬▬▬▬▬▬▬▬▬▬▬▬▬▬▬▬ --

Signed and Sealed this
Twenty-fourth Day of May, 2016

Michelle K. Lee
*Director of the United States Patent and Trademark Office*